(No Model.)

F. M. LAMPSON, A. M. LANING & G. W. HOGBEN.
PLASTER FASTENER.

No. 356,945. Patented Feb. 1, 1887.

WITNESSES:
O. D. Mott
C. Sedgwick

INVENTOR:
F. M. Lampson
A. M. Laning
G. W. Hogben
BY Munn & Co
ATTORNEYS.

United States Patent Office.

FOREST M. LAMPSON, ALPHEUS M. LANING, AND GEORGE W. HOGBEN, OF RIPON, WISCONSIN.

PLASTER-FASTENER.

SPECIFICATION forming part of Letters Patent No. 356,945, dated February 1, 1887.

Application filed October 4, 1886. Serial No. 215,271. (No model.)

*To all whom it may concern:*

Be it known that we, FOREST M. LAMPSON, ALPHEUS M. LANING, and GEORGE W. HOGBEN, all of Ripon, in the county of Fond du Lac and State of Wisconsin, have invented a new and Improved Plaster-Fastener, of which the following is a specification, reference being had to the annexed drawings, forming a part thereof, in which—

Figure 1:
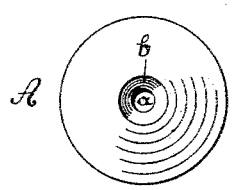
Figure 2:
Figure 3:
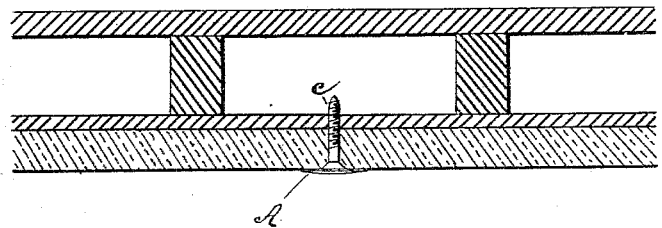

Figure 1 is a plan view of our improved plaster-fastener. Fig. 2 is a diametrical section, and Fig. 3 is an edge view, showing the application of our improved fastener to a wall or ceiling.

Similar letters of reference indicate corresponding parts in all the views.

The object of our invention is to provide a simple and effective device for securing the loose plastering of walls and ceilings.

Our invention consists in a metallic washer formed of thin sheet metal, slightly convex, and provided with a countersink in the center thereof, formed by the process of stamping.

In buildings having walls and ceilings formed of lath and plaster it frequently happens that by the shrinking of the lath or the settling of the building the plaster becomes loose on the lath, so that it is liable at any time to be detached by slight jars, thus destroying the surface of the wall or ceiling, and necessitating replastering. By means of our improved fastener we are enabled to secure plastering loosened in this way before it becomes cracked and disintegrated, thereby obviating the inconvenience and expense of replastering.

In carrying out our invention we form a washer, A, of sheet metal, by the process of stamping or spinning, the washer being preferably made of very thin metal to render it unnoticeable when applied to the wall or ceiling. In the center of the washer, around the screw-hole $a$, is formed a countersink, $b$, for receiving the head of the screw $c$, by which the washer is applied to the wall; and to stiffen the washer and cause it to exert a pressure around its edges upon the plastering to which it is applied, and also to cause it to cut into the plastering slightly, so as to render the edge of the washer invisible, the washer is made outwardly convex, as shown in the drawings.

The fastener is applied to the loose plastering by boring a hole through the plastering into the lath, placing the washer A centrally over the hole, and inserting a screw through the washer into the hole in the plastering and screwing it into the lath so as to bring the washer to a firm bearing on the face of the plastering. When applied in this manner, the washer is rendered unnoticeable by paper applied to the wall or ceiling, or by calcimine or paint applied thereto in the usual way.

Having thus fully described our invention, we claim as new and desire to secure by Letters Patent—

1. A plaster-fastener formed of a sheet-metal washer countersunk in the center thereof and made slightly convex, substantially as described.

2. The combination, in a plaster-fastener, of the sheet-metal washer A, having the countersink $b$ in the center thereof and made outwardly convex, and the screw $c$, having a beveled head adapted to fill the countersink $b$ at the center of the washer, substantially as described.

FOREST M. LAMPSON.
ALPHEUS M. LANING.
GEORGE W. HOGBEN.

Witnesses:
FREDERICK SPRATT,
C. M. COOLEY.